US012737674B2

(12) United States Patent
Fedulova et al.

(10) Patent No.: US 12,737,674 B2
(45) Date of Patent: Sep. 15, 2026

(54) COMBINING MODEL OUTPUTS INTO A COMBINED MODEL OUTPUT

(71) Applicant: KONINKLIJKE PHILIPS N.V., Eindhoven (NL)

(72) Inventors: Irina Fedulova, Moscow (RU); Fedor Mushenok, Moscow (RU); Hans-Aloys Wischmann, Henstedt-Ulzburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1144 days.

(21) Appl. No.: 17/774,510

(22) PCT Filed: Nov. 4, 2020

(86) PCT No.: PCT/EP2020/080849

§ 371 (c)(1),
(2) Date: May 5, 2022

(87) PCT Pub. No.: WO2021/089570

PCT Pub. Date: May 14, 2021

(65) Prior Publication Data

US 2022/0391760 A1 Dec. 8, 2022

(30) Foreign Application Priority Data

Nov. 8, 2019 (RU) ................................ 2019135880

(51) Int. Cl.
*G06N 20/00* (2019.01)
*G06F 18/21* (2023.01)
(Continued)

(52) U.S. Cl.
CPC ........... *G06N 20/00* (2019.01); *G06F 18/217* (2023.01); *G06F 18/23* (2023.01); *G06F 18/25* (2023.01)

(58) Field of Classification Search
CPC ...... G06N 20/00; G06N 20/20; G06N 3/0464; G06N 3/09; G06N 3/0455; G06N 3/096; G06F 18/217; G06F 18/23; G06F 18/25
See application file for complete search history.

(56) References Cited

U.S. PATENT DOCUMENTS

2017/0372201 A1 12/2017 Gupta
2019/0095756 A1 3/2019 Agrawal
(Continued)

FOREIGN PATENT DOCUMENTS

WO WO2019067960 A1 4/2019
WO WO2019211307 A1 11/2019
WO WO2020156925 A1 8/2020

OTHER PUBLICATIONS

PCT International Search Report, International application No. PCT/EP2020/080849, Feb. 23, 2021.
(Continued)

*Primary Examiner* — Imad Kassim

(57) ABSTRACT

The invention relates to a prediction system (100) for applying multiple trained models to an input instance, for example, for detection or segmentation of objects in a medical image. The multiple trained models form a combined model. A trained model determines a model output for an input instance by determining a representation of the input instance in a common latent space and determining the respective model output therefrom. The combined model further comprises dataset fingerprints of the multiple trained models, characterizing representations of its training instances in the latent space. To determine an output of the combined model for an input instance, correspondence scores are determined between the input instance and the multiple trained models, indicating correspondences between the input instance and the respective training dataset in the latent space. The combined model output is
(Continued)

determined by combining respective models according to the correspondence scores.

14 Claims, 5 Drawing Sheets

(51) Int. Cl.
*G06F 18/23* (2023.01)
*G06F 18/25* (2023.01)

(56) References Cited

U.S. PATENT DOCUMENTS

| | | | | |
|---|---|---|---|---|
| 2019/0332900 | A1 * | 10/2019 | Sjolund | A61N 5/1039 |
| 2020/0242623 | A1 * | 7/2020 | Savir | G06F 40/30 |
| 2021/0117869 | A1 * | 4/2021 | Plumbley | G06F 18/217 |
| 2021/0192282 | A1 * | 6/2021 | Goodsitt | G06F 16/9027 |
| 2021/0357819 | A1 * | 11/2021 | Levacher | G06N 20/20 |
| 2021/0406260 | A1 * | 12/2021 | Sharifi | G06F 16/2428 |

OTHER PUBLICATIONS

Pan S. J. et al., "A Survey on Transfer Learning", IEEE Transactions on Knowledge and Data Engineering, vol. 22, No. 10, pp. 1359, Oct. 2010.
Krizhevsky A. et al., "ImageNet Classification with Deep Convolutional Neural Networks", Communications of the ACM, vol. 60, Issue 6, Jun. 2017 pp. 1-9.
Simonyan K. et al., "Very Deep Convolutional Networks for Large-Scale Image Recognition", International Conference Learning Representations, pp. 1-14, 2015.
He K. et al., "Delving Deep Into Rectifiers: Surpassing Human-Level Performance on Imagenet Classification", Proceedings IEEE International Conference Computer Vision Foundation, vol. 2015 Inter, pp. 1026-1034, 2015.
Dluhos P. et al., "Multi-Center Machine Learning in Imaging Psychiatry: A Meta-Model Approach", Neurolmage, vol. 155, Jul. 2017, pp. 10-24, 2017.
Chang K. et al., "Distributed Deep Learning Networks Among Institutions for Medical Imaging," Journal of American Medical Informatics Association, vol. 25, No. 8, pp. 945-954, 2018.
Shoeb A. et al., "Application of Machine Learning to Epileptic Seizure Detection," ICML'10: Proceedings of the 27th International Conference on International Conference on Machine Learning, Jun. 2010, pp. 975-982.
Tsioris K. M. et al., "A Robust Unsupervised Epileptic Seizure Detection Methodology to Accelerate Large EEG Database Evaluation", Biomedical Signal Processing and Control, vol. 40, pp. 275-285, 2018.
Lu Y. et al., "Anomaly Detection for Skin Disease Images Using Variational Autoencoder", ISIC Skin Image Analysis Workshop and Challenge at MICCAI 2018.
Schleg T. et al., "Unsupervised Anomaly Detection with Generative Adversarial Networks to Guide Marker Discovery", To be published in the proceedings of the International Conference on Information Processing in Medical Imaging (IPMI), 2017, Computer Vision and Pattern Recognition.
Kwon D. et al., "A Survey of Deep Learning-Based Network Anomaly Detection", Cluster Computer, 22: S949-S961, 2019.
Kiran B. R. et al., "An Overview of Deep Learning Based Methods for Unsupervised and sSmi-Supervised Anomaly Detection in Videos", Journal of Imaging, vol. 4, No. 36, pp. 1-25, 2018.
Baker B. et al., "Designing Neural Network Architectures Using Reinforcement Learning", Published as a conference paper at ICLR 2017.
Joyce T. et al., "Robust Multi-Modal MR Image Synthesis", Sep. 4, 2017 (Sep. 4, 2017), Big Data Analytics in the Social and Ubiquitous Context: 5th International Workshop on Modeling Social Media, MSM 2014, 5th International Workshop on Mining Ubiquitous and Social Environments, Muse 2014 and First International Workshop on Machine LE, XP047429105.
Snell et al. , "Prototypical Networks for Few-shot Learning" , arXiv [online] , Jun. 19, 2017, Retrived from the Internet: <URL: https://arxiv.org/pdf/1703.05175.

* cited by examiner

COMBINING MODEL OUTPUTS INTO A COMBINED MODEL OUTPUT

CROSS-REFERENCE TO PRIOR APPLICATIONS

This application is the U.S. National Phase application under 35 U.S.C. § 371 of International Application No. PCT/EP2020/080849, filed on Nov. 4, 2020, which claims the benefit of Russian Patent Application No. 2019135880, filed on Nov. 8, 2019. These applications are hereby incorporated by reference herein.

FIELD OF THE INVENTION

The invention relates to a prediction system for applying multiple trained models to an input instance, for example, for detection or segmentation of objects in a medical image. The invention further relates to a training system for fingerprinting a trained model, and to a corresponding computer-implemented method. The invention also relates to a combination system for determining a combined model from multiple trained models, and a corresponding computer-implemented method. The invention further relates to a computer-readable medium.

BACKGROUND OF THE INVENTION

Epilepsy is a chronic brain disorder and is one of the most common neurological diseases globally. According to the world health organization, approximately 50 million people worldwide have epilepsy. One of the most common methods to diagnose and monitor epilepsy is based on the non-invasive measurement of the electrical activity of the brain, called electroencephalogram (EEG). One of the common tasks that are relevant in the clinical practice is offline seizure labelling ("segmentation"). For example, for disease progression monitoring and treatment planning, a patient's EEG may be monitored, e.g., for one or more hours continuously. After signal acquisition is completed, a doctor may review the EEG signal and manually label periods where epileptic EEG activity was observed for subsequent analysis, e.g. epileptic activity source localization.

Segmentation of EEG signals is an example of a task in (medical) signal processing or (medical) image processing where hard-coded and/or statically configured representations of knowledge are more and more being replaced by solutions created using Artificial Intelligence (AI), such as Machine-Learning (ML) and/or Deep Learning (DL) methods. Machine learning may be based on formulating a solution in a parametric form, and then determining model parameters through training, e.g., in the iterative process. E.g., in supervised learning, a system may be presented with a set of input instances and their corresponding desired model outputs. The collection of input-output pairs may be referred to as a training dataset. A training system typically analyses the training data and produces a trained model, which can be used for mapping previously unseen new input instances (sometimes called "inference"). An important property of machine learning models is their ability to generalize, e.g., to perform adequately on the new, unseen input instances after training.

In the setting of epileptic seizure detection, it is known that epileptic patterns within the EEG signal typically vary greatly from patient to patient. For example, epileptic activity in some patients can be very similar to normal activity in other patients, and vice versa. In order to provide good seizure segmentation quality, models need to be trained on a large or huge number of examples of epileptic activity recorded from different patients. More generally, in order to build accurate machine learning models with a good ability to generalize it is usually beneficial to use as much training data from as many different sources as possible. For example, for medical imaging data, it is important to collect as much data as possible to make sure that machine learning models perform adequately for different populations, for data coming from different medical equipment vendors, etc. Training dataset size is especially important in the case of highly heterogeneous data. For example, it is important to avoid bias against rare diseases or conditions with a low prevalence, where machine learning models built on relatively small numbers of subjects may suffer from poor generalizability.

In practice, building a large enough dataset often means collecting data from multiple organizations, for example, representing data across different countries and/or representing different cohorts in terms of gender, age, ethnicity, or similar. For example, in the case of epileptic seizure detection, relatively small databases of labelled epileptic seizure EEG data are available at clinics, but combining this data into a single dataset is very difficult in practice due to technical, legal, and ethical concerns. Like other medical data, EEG data is sensitive and accordingly its sharing is strongly regulated, with confidentiality, consent, privacy, and geography/residency requirements making it practically impossible to collect data in one place. Also the exchange of non-personal information may be practically difficult because of confidentiality. For example, a system comprising a trained model deployed at a customer site may be improved by learning from the data on which the system is used, but customers are typically hesitant to provide such information. Generally, data sharing limitations are common across the healthcare domain and in many other domains, such as finance or commerce, where trade secrets and confidential information cannot be shared.

In the paper "Multi-center machine learning in imaging psychiatry: A meta-model approach" by Petr Dluhoš et al. (incorporated herein by reference), it is proposed to create a meta-model by combining support vector machine (SVM) classifiers trained on respective local datasets, without sharing the underlying training datasets, e.g., medical images or any other personal data. There, SVM models are built to separate patients from controls based on three different kinds of imaging features derived from structural MRI scans. The meta-model is an averaged model computed as a geometric average of the SVM weights of the local models. In the presented experiments, the distribution of confounding parameters such as age, gender or handedness between patients and controls was balanced and the individual datasets were standardized before computations.

There is a need for improved techniques for applying multiple trained models to an input instance, in which the multiple trained models are trained on respective training dataset, and in which the respective training datasets do not need to be collected and processed in one place, for example in the setting of classification or regression on medical sensor data. For example, it would be desirable to further improve the accuracy of such techniques. In particular, it would be desirable to have higher accuracy for models that are combined from less homogeneous datasets, for example, datasets where the distribution of patient age/gender/ . . . differs significantly between datasets, and/or datasets where different kinds of sensors, e.g., different or differently configured medical image scanners, are used between datasets.

SUMMARY OF THE INVENTION

In accordance with a first aspect of the invention, a prediction system for applying multiple trained models to an input instance is provided. In accordance with a further aspect of the invention, a training system is provided for fingerprinting a trained model. In accordance with a further aspect of the invention, a combination system for determining a combined model from multiple trained models is provides. In accordance with a further aspect of the invention, a computer-implemented method of applying multiple trained models to an input instance is provided. In accordance with a further aspect of the invention, a computer-implemented method of fingerprinting a trained model is provided. In accordance with a further aspect of the invention, a computer-implemented method of determining a combined model from multiple trained models is provided. In accordance with a further aspect of the invention, a computer-readable medium is provided.

Various features involve the determination of a combined model, and the use of such a combined model for making predictions. The term "prediction" is here used in the common machine learning sense of the word, namely, as performing inference about previously unseen input instances based on a training dataset, e.g., in a regression or a classification task. The term "prediction" thus does not imply any temporal relation, but also includes detection and delineation of objects, classification and labelling. The combined model typically acts on sensor data. As an example, an input instance may comprise an image or a stack of multiple images. As another example, an input instance may comprise single-channel or multi-channel time-series sensor data. For example, such time-series sensor data may comprise vital parameters of an Intensive Care Unit (ICU), e.g., spatio-temporal physiological measurements such as electroencephalography (EEG) data, electrocardiogram (ECG) data, and/or 2D or 3D medical images.

The model used for prediction may be a "combined model" in the sense that it comprises multiple trained models. Combined models are also referred to in the art as meta-models or ensemble models, although those terms are sometimes also used more specifically for a combination of multiple trained models each trained on the same dataset. In various embodiments, however, the multiple trained models are trained on respective training datasets, for example, of different organizations. For example, these organizations cannot share the training datasets with each other but still want to enable the creation and use of a combined model based on the respective training datasets. The multiple trained models may have a common architecture, e.g., each trained model may employ the same procedure to determine a model output from an input instance but use a respective set of parameters obtained by training on a respective dataset. However, this is not needed, e.g., as a result of manual or automatic model selection, different types of trained model may be obtained for different training datasets.

Interestingly, the multiple trained models typically have a common latent space defined by the combined model. Generally, a latent space may be an intermediate representation of an input instance used by a machine learning model to determine a model output from. Typically, a latent space representation represents low-level features of the image/sensor data. For example, a latent space may comprise the values of neurons at an internal layer of a neural network or deep Gaussian process; an output of any type of embedding model such as an encoder part of an auto-encoder; values of manually handcrafted features extracted from the input data, etcetera. Accordingly, a trained model may be configured to determine a model output for an input instance by determining a representation of the input instance in this latent space and determining the model output therefrom. The part of the trained model that determines the latent space representation may be referred to throughout as a "feature extractor" and the part of the trained model that determines the model output from the latent space representation may be referred to as a "prediction model", e.g., a classifier or a regression model.

As discussed in more detail elsewhere, the multiple trained models may each use the same feature extractor, but it is also possible to use different feature extractors as long as the results of comparing latent space representations of an input instance and latent space representations of training instances can be measured consistently across the trained models. For example, as discussed below, a trained model may include a refined version of a pre-trained feature extractor that is refined to improve performance of the trained model on its respective training dataset. In this case and other similar cases, although respective trained models may use different feature extractors, e.g., that differ in parameters only, differences between latent space representations defined by the respective feature extractors may still be comparable.

Interestingly, various features involve a combined model that comprises not just the trained models, but also respective dataset fingerprints of the respective trained models. Such a dataset fingerprint may characterize at least latent space representations of training instances of the training dataset of the trained model. For example, a dataset fingerprint may comprise statistical properties of the latent space representations of training instances, e.g., parameters of a probability distribution fit to some or all features of the latent space representations. Other examples of dataset fingerprints are provided throughout.

By characterizing the latent representations of training instances, the dataset fingerprint may allow to determine, given a latent representation of an instance, e.g., a non-training instance, a deviation of the latent representation of the instance from latent representations of the training instances, and thereby establish whether the instance corresponds to instances that the model was trained on. In other words, based on the dataset fingerprint, it may be possible to determine whether or not the instance is an outlier with respect to the particular training dataset, e.g., whether the instance is unlikely to occur, or have occurred, in the training population or in a population from which the training dataset was drawn.

The dataset fingerprints are preferably aggregated, e.g., they represent the training dataset as a whole instead of including latent space representations of any particular training instances. Accordingly, information about any single training instance of the training dataset typically cannot be derived from the dataset fingerprint, which may make it possible to share the dataset fingerprint without affecting privacy, e.g., in case of medical data, or confidentiality, e.g., for trade secrets e.g. in finance applications. This is helped by the use of latent representations in the dataset fingerprint, e.g., including other information about an input feature, even in aggregated way, may generally leak more information about particular training instances than including information about latent space representations. The dataset fingerprint may even be configured to satisfy an anonymity property, e.g., k-anonymity, with respect to the training dataset, e.g., by applying techniques that are known per se such as adding noise or removing data that is computed from an insufficient number of training instances. Accordingly, because the dataset fingerprint is aggregated, it may be shared between organizations, e.g., included in a combined model that is shared, even in situations where the training dataset cannot be shared, e.g., because of privacy constraints.

Although privacy is an important aspect, it is not the only reason to prefer data fingerprints based on latent representations: for example, latent representations may be smaller, sometimes a lot smaller, than the input instances. As a result, characterizing a training dataset in terms of latent space representations can save a lot of storage and communication. For example, training datasets of medical images can easily be gigabytes, terabytes or even petabytes in size. As a result, when transferring some or all training instances, e.g., for determining which instances are best represented in which training dataset, a lot of communication and/or computation can be saved.

As the inventors realized, the use of dataset fingerprints can effectively enable the combined model to be applied not as a fixed ensemble of the trained models that it includes, but as an ensemble that is dynamically adapted to a particular input instance by taking into account the relevance of the respective trained models for that input instance. Essentially, the combined model and the information about the relevance of the trained models, captured as a correspondence score as described below, may together be considered as a dynamically constructed ensemble optimized for that input instance.

By taking the respective correspondence scores into account, e.g., in selecting or weighting the respective trained models, a more accurate overall model output can be obtained. For instance, consider an ensemble comprising a first and a second machine learning model. Applying a fixed ensemble model on a first and second instance that are more similar to the first and second machine learning model, respectively, may result in a suboptimal result by assigning too little importance to the output of the first model for the first instance, assigning too little importance to the output of the second model for the second instance, or both. For example, the first instance may be an outlier for the second model, producing an unpredictable result that can adversely affect accuracy of the overall output. However, dynamically adapting the ensemble based on correspondence scores as described herein allows the overall model output for the first instance to be more heavily based on the model output of the first model and the overall model output for the second instance to be more heavily based on the model output of the second model. Accordingly, overall accuracy of the combined model may be improved while still using only aggregated information about the training datasets, e.g., the trained model and the dataset fingerprint. For example, the increased accuracy may be measured in terms of various objective measures, e.g. sensitivity and/or specificity and/or DICE coefficient.

Specifically, when applying the combined model to an input instance, correspondence scores between the input instance and the multiple trained models may be determined based on a representation of the input instance in the latent space and the dataset fingerprint of the trained model. The way the latent space representation is compared to the fingerprint depends on what exact fingerprint is used. For example, in case the fingerprint comprises mean or median values of one or more features, a Euclidean distance or a weighted Minkowski distance can be used. Various other examples are discussed throughout. It is possible to use the same the latent space representation to determine each correspondence score, e.g., this is appropriate if the trained models have a common feature extractor. However, also respective latent feature representations, e.g., determined by respective feature extractors of the respective trained models, may be used to determine respective correspondence scores.

The correspondence score between an input instance and a trained model may indicate a correspondence between the input instance and the training dataset of the trained model and may accordingly allow to improve accuracy of a model output by assigning relatively more importance to model outputs of models with a high correspondence. Accordingly, model outputs for the input instance may be determined of one or more of the multiple trained models, e.g., all trained models or a strict subset of trained models that sufficiently correspond to the training instance. The determined model outputs may then be combined into a combined model output according to the determined correspondence scores of the respective trained models, for example, as an average of the subset of sufficiently corresponding models, as a weighted average, as a majority score, as a weighted majority score, or in any other way in which model output of trained models with higher correspondence more heavily influence the combined model output. For example, model outputs of a strict subset of the trained models may be combined into the combined model output.

Advantageously, the dataset fingerprint of the trained model may be determined based on the training dataset. Typically this is done when the model is being trained, e.g., the training and the determining of the dataset fingerprint typically take place in the same organization. The trained model and corresponding dataset fingerprint may then be provided to another party for combining multiple such trained models and corresponding dataset fingerprints into a combined model, uploaded to a repository of trained models with associated fingerprints, etc. The combining can be done, for example, by the organization, e.g., the hospital, that also applies the model. For example, an organization may train a model and generate an accompanying dataset fingerprint, and share the model and fingerprint with one or more other organizations, and receive respective trained models and fingerprints from the other organizations in return.

It is however also possible for trained models and fingerprints to be collected centrally by an organization that does not necessarily apply the model on new instances itself. For example, the provisioning of a combined model may be offered as a service. Interestingly, such a combining party performing a combining method or operating a combining system as described herein, may perform various other functionality related to the combined model as well. For example, the combining party may orchestrate the overall process of training and determining the fingerprints, e.g., by providing training parameters or hyperparameters, or by specifying a format for the trained model and/or fingerprint, such as a machine learning model type and/or architecture. Specifically, when combining the models and fingerprints into a combined model, also a validation of the combined model on a validation dataset optionally may be performed to provide quality assurance of the combined model. The validation may include determining a contribution of individual models to the overall accuracy, e.g., by comparing an accuracy of the combined model to an accuracy of the combined model from which one of the trained models is removed. Validation results such as the contributions of the individual models can be provided to a user as feedback on the internal workings of the combined model and/or used automatically, e.g. by removing a model that adversely affects accuracy. The impact of each model on the combined model, evaluated on a real-word sequence of input data, may also be used to reward, e.g., financially, the entity that contributed the individual model.

Interestingly, use of the techniques described herein may enable to use the knowledge of multiple models comprised in the combined model, for example, at least three, at least five, or at least ten such models. The respective training datasets of the respective models do not necessarily need to be very large. In contrast, techniques from transfer learning, that are known in the art per se, typically use one training dataset to obtain a pre-trained model and then allow this pre-trained model to be refined in respective institutions where it is deployed, but do not provide knowledge sharing between these institutions. Moreover, in transfer learning, accuracy greatly depends on the quality of the initial dataset used to obtain the pre-trained model, e.g., a large initial dataset may be needed. Also the dataset used to refine the pre-trained model may need to be relatively large, and it needs to be available at a single institution. For example, in image classification, results have been obtained in transfer learning based on very large datasets with ground truth labelling provided via massive crowd-sourcing efforts. In various cases, for example for medical image classification, collecting such a large dataset in one place is difficult, and using crowd-sourcing to obtain labelling even more so given that such labelling needs to be performed by a doctor and the images typically cannot be shared with the outside world, e.g., because of privacy. Another advantage compared to transfer learning is that so-called "catastrophic forgetting", e.g., the tendency in learning a neural network to completely and abruptly forget previously learned information, may be avoided.

For example, obtaining a single large labelled dataset for epileptic seizure detection in the electroencephalography (EEG) signal may be very difficult. However, for this application, relatively small, but high quality, datasets exist at several clinics with significantly different populations and environments, to which the techniques as described herein may be successfully applied.

Another advantage of the techniques provided herein is that they work for a wide range of machine learning models. For example, the respective trained models comprised in the combined model may need to share a common latent space, but there are many different kinds of machine learning models, e.g., many neural network or deep Gaussian process architectures, that satisfy this property. As mentioned, the type of models used at the different organizations can also differ from each other, or at least the parameters or hyper-parameters used across the training datasets can differ. For example, for a relatively small or relatively coherent dataset, different hyperparameters for the prediction model may be appropriate compared to a larger or less coherent dataset. A still further advantage is that the training of the respective trained models can to a large extent happen independently from each other, e.g., no synchronization may be needed while the respective trained models are trained on the respective datasets. Also, combined models as described herein may enable adding, removing, and/or replacing of trained models from the combined model, thereby allowing the combined model to be continuously improved as more or better data becomes available.

Optionally, the determined model outputs may be combined into the combined model output by applying a trainable combination model to the determined correspondence scores and model outputs. The trained combination model is typically comprised in the combined model and as such may be distributed along with the trained models and their fingerprints for applying the combined model. As discussed, various non-trainable techniques may be used to combine the determined model outputs into the combined model, e.g., an average or a majority vote. However, as the inventors realized, by training a combination model, the accuracy of the determined model outputs can be further improved. For example, the combination model can be a decision tree for selecting one or more particular model outputs to use in the combination, a linear regression model for computing the combined model output from the determined model outputs, etcetera. The combination model can be trained by the party constructing the combined model, for example, but it is also possible to train the combined model using distributed learning techniques on the training datasets of the respective trained models, which may be a lot more feasible than an overall distributed learning approach since the dataset used to train the combination model can be relatively small and can use smaller inputs.

Optionally, a reliability score of the combined model output may be determined based on the determined correspondence scores. The reliability score may indicate a correspondence between the input instance and the combination of the training datasets of the multiple trained models. As the inventors realized, since the correspondence scores indicate a correspondence between the input instance and the respective training datasets, they may not only be used as a measure of the relative suitability of the trained models, but also as a measure of the expected reliability of the combined model that can be compared across input instances. For example, the number of model outputs that are combined in the combined model output may be used as a correspondence score, or an appropriate combination of the correspondence scores such as an average. If the reliability indicated by the reliability score does not match a predefined threshold, for example, an error may be logged and/or flagged to a user in a sensory perceptible manner.

Optionally, the dataset fingerprint of the trained model may comprise multiple cluster centroids in the latent space. A cluster centroid may represent a cluster of training input instances. For example, the feature extractor of the trained model may be used to obtain representations of the training instances of the training dataset in the latent space, and a clustering algorithm as known per se in the art may be applied to the latent space representations to obtain the multiple cluster centroids. A correspondence score between the input instance and the trained model may be determined based on similarity values between the input instance and the multiple cluster centroids. By using techniques for clustering that are known per se, a good aggregated summary of the various training instances of the training dataset can be obtained. The latent feature vector of the input instance can be compared to the centroids in various ways, e.g., by computing a cosine similarity, a Euclidean distance or a weighted Minkowski distance. Depending on the application, for example, using the minimal, maximal, or average distance to centroids may be appropriate as a correspondence score. For example, for accuracy a closest centroid distance may be preferred whereas for reliability an average or maximum centroid distance may be more appropriate.

Optionally, the dataset fingerprint of the trained model may comprise a generative model. The correspondence score between the input instance and the trained model may be determined based on a likelihood of the latent space representation being generated by the generative model. For example, as is known in the art, various known generative models such as the generator of a Generative Adversarial Network (GAN) or an autoencoder or a variational autoencoder (VAE), can be trained on a dataset and then allow to determine, for an instance, a probability of that instance being generated by the generative model. The autoencoder model may be trained to generate latent space representations of instances of the training dataset. In this case, the correspondence score for an input instance may be determined by determining a latent representation of the input instance and computing a likelihood of that latent representation being generated by the autoencoder model, and similarly for other types of generative model. The autoencoder model may also correspond to the feature extractor of the trained model, the correspondence score being determined by determining a likelihood of the input instance itself being generated by the autoencoder model. Interestingly, a generative model trained on a training dataset does not typically reveal, potentially privacy-sensitive, information about particular training instances.

Optionally, the determined model outputs may be combined into a combined model output by computing a weighted sum of the determined model outputs based on the respective correspondence scores. By using a weighted sum of determined model outputs instead of, e.g., selecting a subset of model outputs to be used, more fine-grained use of the correspondence scores can be made, leading to higher accuracy. Weights of the weighted sum are typically increasing in the correspondence indicated by the correspondence score, e.g., the weights can be proportional to a correspondence score representing a degree of correspondence or inversely proportional to a correspondence score representing a difference between a dataset fingerprint and an input instance.

Optionally, the correspondence score between the input instance and the trained model may be further based on the input instance and/or a model output of the trained model for the input instance. The dataset fingerprint of the trained model may further characterize training instances and/or training outputs, typically labels of the training dataset. For example, some or all features of the input instance or the output of the trained model may be added to the latent space representation in order to determine the dataset fingerprint, or may be dealt with separately, e.g., by separately including statistics about the input or output features to the fingerprint. This way, accuracy may be further improved by determining more accurate correspondence scores. it is noted that, if a model output is used to determine a correspondence score, this does not mean that the model output is also used for the combined model, e.g., only a subset of the determined model outputs may be used.

Optionally, the input instance comprises time-series sensor data, for example, of physiological measurements. This type of data, for example temporal vital sign segment data, occurs a lot in medical data analysis. Examples of physiological measurements are EEG data, ECG data, ICU monitoring data, etcetera. Optionally, the input instance comprises an image, for example, a medical image. These kinds of data are typically relatively large and detailed, and can thus contain a lot of sensitive information that is difficult to exchange between organizations, or is simply too large to be exchanged between organizations. Using the techniques herein, a combined model can nonetheless be obtained.

Various types of trained model can be used as appropriate for the data to which they are applied, for example, an SVM classifier, a gradient boosted tree, a neural network etcetera. For example, various types of neural network architecture can be used, such as a deep neural network, a convolutional neural network, etcetera. Neural networks are also known as artificial neural networks. The number of parameters of a trained model can be quite large, e.g., at least 10.000, or at least 1 million, at least 100 million, etc.

Optionally, a pre-trained feature extractor for determining representations of input instances in the latent space may be used. For example, the multiple combined models may share the same pre-trained feature extractor, for example, pre-trained on an initial dataset by the party determining the combined model, for example, a publicly available dataset. Respective trained models of the combined model may be trained based on the pre-trained feature extractor. Optionally, this training may comprise refining the pre-trained feature extractor to increase accuracy, as is known per se from the field of transfer learning.

Regardless of whether the feature extractor is refined however, the use of a pre-trained feature extractor common between the trained models may help to ensure that the latent representations or at least the correspondence scores resulting from them are comparable between the trained models of the combined model.

Optionally, the respective trained models may be trained based on a pre-trained prediction model for determining model outputs from representations of input instances in the latent space. Similarly to the pre-trained feature extractor, this pre-trained prediction model may be trained on an initial dataset, e.g., a publicly available dataset, for example, by the party producing the combined model. When training a respective trained model, the pre-trained prediction model may be refined based on the respective training dataset, e.g., using techniques from transfer learning that are known per se. By basing the prediction models on a common pre-trained model, the accuracy of the resulting models may be improved but also the comparability of their outputs, e.g., they may provide similarly scaled outputs so that they can be more easily combined into a combined model output. Optionally, the party producing the combined model may train a feature extractor for determining representations of input instances in the latent space. For example, the feature extractor can be an initial feature to be refined in respective trained models or a common feature extractor to be used by each of the trained models. It is also possible to train the features extractor at least in part using distributed learning techniques on the training datasets of the respective trained models. This can increase accuracy while still allowing at least the prediction models to be trained separately. Optionally, the party producing the combined model may train an initial prediction model for determining model outputs from representations of input instances in the latent space, e.g., for refinement in the respective trained models.

Optionally, the party producing the combined model may train a combination model for combining model outputs into combined model outputs for increasing the accuracy of the combination operation. For example, training the combination model may comprise one or more iterations of determining a combined model output for a training input instance based on the outputs and correspondence scores of the respective trained models; deriving a training signal from a difference between the determined combined model output and a training output corresponding to the training input instance; and adjusting the combination model according to the training signal. The combination model may be included in the combined model.

Optionally, the party producing the combined model may be configured to update the combined model by adding, removing, and/or replacing trained models and their respective dataset fingerprints. Interestingly, since the respective trained models are relatively separate from each other, this may be more feasible than in the cases of a single model trained on a combined dataset. Accordingly, a model based on the respective training datasets may be obtained that can be more flexibly adapted to changes in the available training data.

Optionally, a single entity may fingerprint multiple trained models, and optionally combined the multiple trained models into a combined model as described herein. For example, a combined dataset may be obtained and then separated into multiple training datasets. e.g., multiple disjunct training datasets. Trained models for the respective training datasets may then be obtained and their fingerprints determined as described herein, and the multiple trained models may be combined into the combined model. Interestingly, this may lead to a more accurate model for the combined dataset compared to conventional training of a model for the combined dataset, as the dynamically adaptive combination via the latent features may be better at adapting to different sub-cohorts that were combined into the original dataset.

As will be appreciated, also a combined system comprising multiple training systems as described herein, a combination system as described herein, and one or more prediction systems as described herein, is envisaged. Some or all of the systems may have dual roles, e.g., the set of training systems and the set of prediction systems may overlap. In such a combined system, training systems may train models and determine dataset fingerprints to be provided to the combination system, which may determine a combined model to be provided to the prediction systems for applying it to input instances.

It will be appreciated by those skilled in the art that two or more of the above-mentioned embodiments, implementations, and/or optional aspects of the invention may be combined in any way deemed useful.

Modifications and variations of a system as described herein, can be carried out by a person skilled in the art on the basis of the present description. Modifications and variations of any computer-implemented method and/or any computer program product, which correspond to the described modifications and variations of a corresponding system, can be carried out by a person skilled in the art on the basis of the present description.

BRIEF DESCRIPTION OF THE DRAWINGS

These and other aspects of the invention will be apparent from and elucidated further with reference to the embodiments described by way of example in the following description and with reference to the accompanying drawings, in which.

It should be noted that the figures are purely diagrammatic and not drawn to scale. In the figures, elements which correspond to elements already described may have the same reference numerals.

LIST OF REFERENCE NUMBERS

Figure 2:
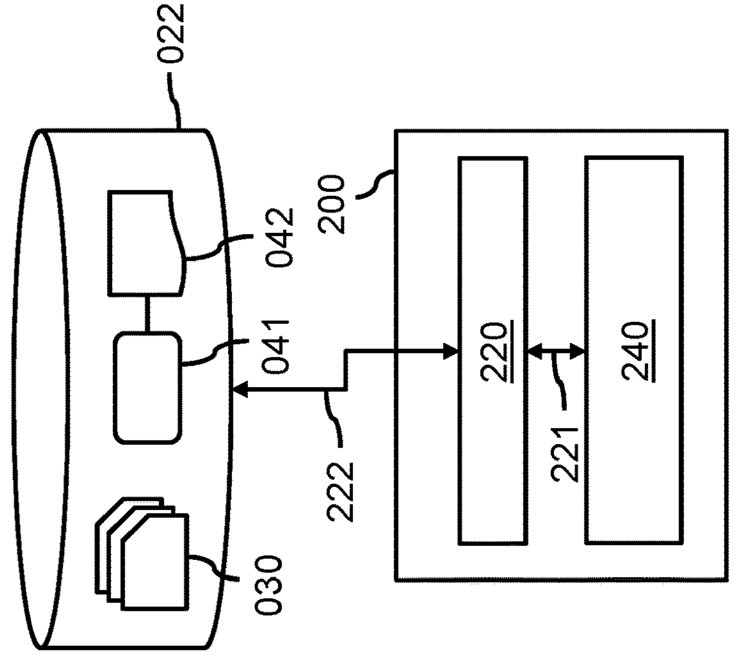
FIG. 2 shows a training system for fingerprinting a trained model.
Figure 2:

The following list of reference numbers is provided for facilitating the interpretation of the drawings and shall not be construed as limiting the claims.

021, 022, 023 data storage
030 training dataset
040 combined model
041 trained model
042 dataset fingerprint
043 combination model
044 feature extraction model
050 validation dataset
071 sensor
100 prediction system
200, 201, 202 training system
300 combination system
120, 220, 320 data interface
121-124, 221-222, 321-324 data communication
140, 240, 340 processor subsystem
160 sensor interface
380 communication interface
410 input instance
420, 520 feature extraction
430, 530 latent space representation
440, 540 fingerprinting
450 correspondence score
460 model application
470 model output
480 combination operation
490 combined output
510 first training operation
511 initial prediction model
515 second training operation
555 training dataset
560 training
590 validation
600, 700, 800 computer-implemented method
900 computer-readable medium
910 non-transitory data

DETAILED DESCRIPTION OF EMBODIMENTS

Figure 1:
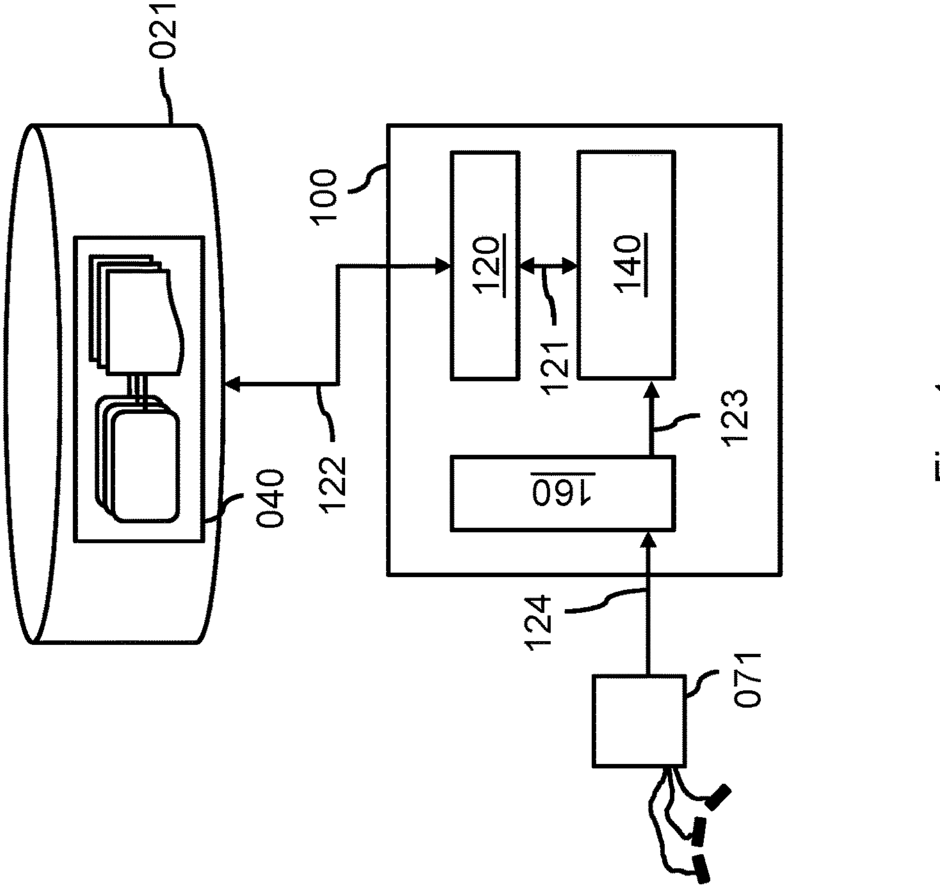
FIG. 1 shows a prediction system using a combined model.

FIG. 1 shows a prediction system 100 for applying multiple trained models to an input instance. The multiple trained models may be trained on respective training datasets. System 100 may comprise a data interface 120 and a processor subsystem 140 which may internally communicate via data communication 121. Data interface 120 may be for accessing the multiple trained models in the form of a combined model 040. The combined model 040 may define a latent space. A trained model may be configured to determine a model output for an input instance by determining a representation of the input instance in the latent space and determining the model output therefrom. The combined model 040 may further comprise respective dataset fingerprints of the multiple trained models. A dataset fingerprint of a trained model may characterize latent space representations of training instances of the training dataset of the trained model. For example, the combined model may be received from another system, e.g., combination system 300 of FIG. 3. System 100 may also be combined with a training system 200 and/or a combination system 300 described herein, e.g., a system may train a model, provide the trained model to a combination system, and receive back a combined model.

The processor subsystem 140 may be configured to, during operation of the system 100 and using the data interface 120, access the combined model 040. For example, as shown in FIG. 1, the data interface 120 may provide access 122 to an external data storage 021 which may comprise said data 040. Alternatively, the data 040 may be accessed from an internal data storage which is part of the system 100. Alternatively, the data 040 may be received via a network from another entity. In general, the data interface 120 may take various forms, such as a network interface to a local or wide area network, e.g., the Internet, a storage interface to an internal or external data storage, etc. The data storage 021 may take any known and suitable form.

The processor subsystem 140 may be further configured to, during operation of the system 100, obtain an input instance. The processor subsystem 140 may be further configured to provide a combined model output for the multiple trained models. To provide the combined model output, the processor subsystem 140 may be configured to, during operation of the system 100, determine correspondence scores between the input instance and the multiple trained models. A correspondence score between the input instance and a trained model may indicate a correspondence between the input instance and the training dataset of the trained model. The correspondence score may be based on a representation of the input instance in the latent space and the dataset fingerprint of the trained model. To provide the combined model output, the processor subsystem 140 may be further configured to, during operation of the system 100, determine model outputs of one or more of the multiple trained models for the input instance. To provide the combined model output, the processor subsystem 140 may be further configured to, during operation of the system 100, combine the model outputs into a combined model output according to the determined correspondence scores of the respective trained models.

In general, the contents of the trained models and data fingerprints comprised in the combined model 040 may be stored along with the combined model, e.g., in storage 021, e.g., in a same file(s) and/or directory/folder. However, it is also possible for the trained model and/or data fingerprints to be stored separately. For example, in some embodiments, the trained model may comprise links to the contents of one or more trained models and/or data fingerprints, e.g., by containing an URL at which the model or fingerprint is accessible. Various other means of association are equally conceivable and within reach of the skilled person.

As an optional component, the system 100 may comprise a sensor interface 160 or any other type of input interface for obtaining sensor data 124 from one or more sensors. The figure shows an electroencephalograph 071. Processor subsystem 140 may be configured to obtain the input instance via data communication 123 based at least in part on the sensor data 124, e.g., by converting the sensor data to input features comprised in the input instance. For example, the camera may be configured to capture an electroencephalography measurement 124, processor subsystem 140 being configured to determine the input instance from measurement data from a given time window, e.g., of 1 or 2 seconds. Generally, the sensor interface may be configured for various types of sensor signals, e.g., video signals, radar/LiDAR signals, ultrasonic signals, etc. Instead or in addition, sensor may be read from storage, e.g., from a recording system such as a PAC (Picture Archiving and Communication) system, a Vendor Neutral Archive (VNA) system, and/or an Electronic Medical Record (EMR) system.

As an optional component, the system 100 may comprise a display output interface or any other type of output interface (not shown) for outputting data to a rendering device, such as a display. For example, the display output interface may generate display data for the display which causes the display to render the data in a sensory perceptible manner, e.g., as an on-screen visualization. For example, the output data may include determined combined model outputs, their reliability scores, etcetera.

The system 100 may also comprise a communication interface (not shown), configured for communication with other systems, e.g. a combination system for obtaining a combined model. Communication interfaces are discussed in more detail in FIG. 3.

Figure 4:
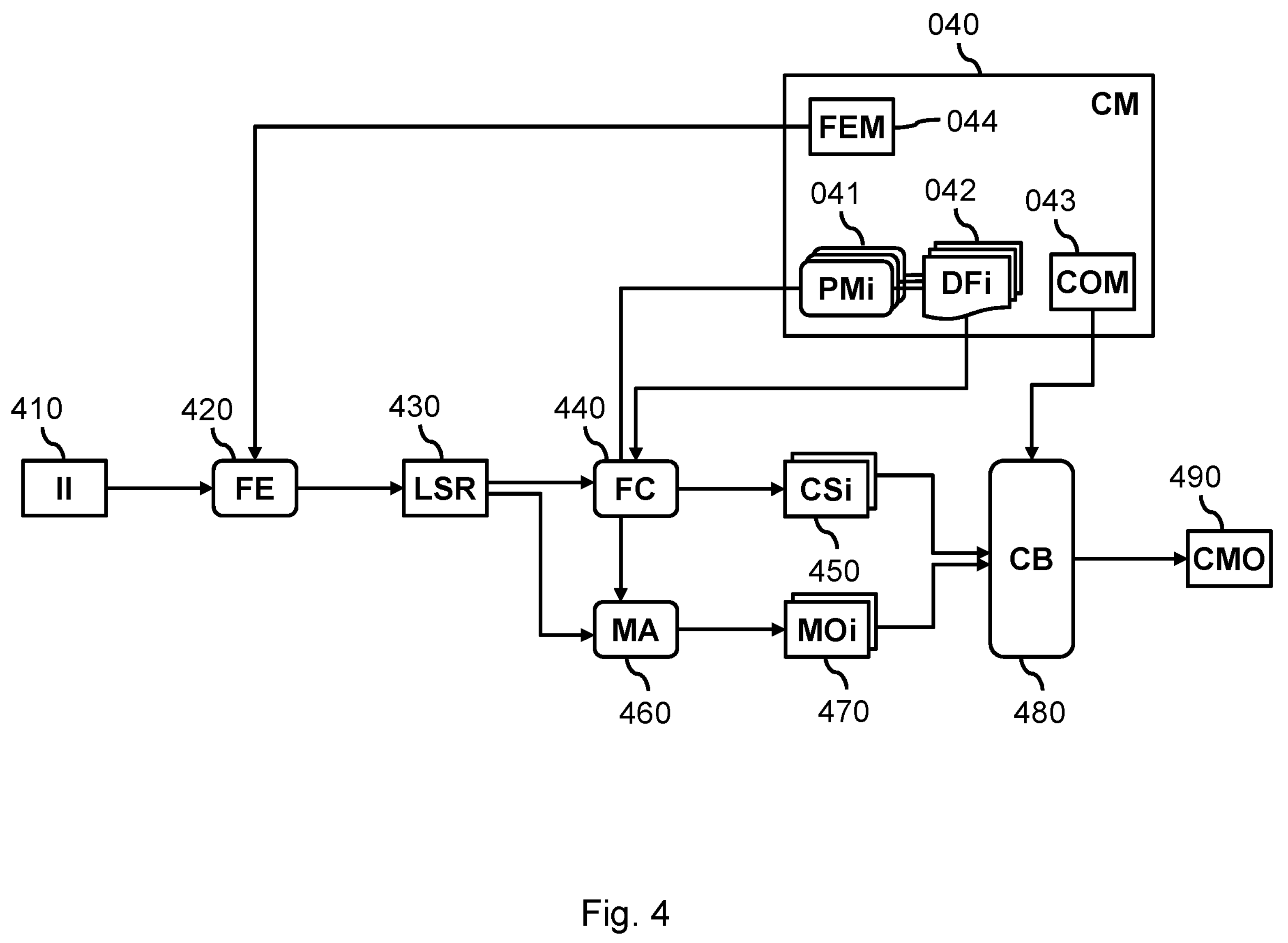
FIG. 4 shows a detailed example of how to use a combined model to determine a combined model output.

Various details and aspects of the operation of the system 100 will be further elucidated with reference to FIG. 4 and others, including optional aspects thereof.

In general, the system 100 may be embodied as, or in, a single device or apparatus, such as a workstation, e.g., laptop or desktop-based, or a server, or a mobile device, e.g., a smartphone. The device or apparatus may comprise one or more microprocessors which execute appropriate software. For example, the processor subsystem may be embodied by a single Central Processing Unit (CPU), but also by a combination or system of such CPUs and/or other types of processing units, such as Graphics Processing Units (GPUs). The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA). In general, each functional unit of the system may be implemented in the form of a circuit. It is noted that the system 100 may also be implemented in a distributed manner, e.g., involving different devices or apparatuses, such as distributed servers, e.g., in the form of cloud computing.

FIG. 2 shows a training system 200 for fingerprinting a trained model. System 200 may comprise a data interface 220 and a processor subsystem 240 which may internally communicate via data communication 221. Data interface 220 may be for accessing a training dataset 030. Data interface 220 may also be for accessing a trained model 041 and/or a dataset fingerprint 042 determined by system 200. System 200 may be combined with system 100 or 300, as further described elsewhere.

The processor subsystem 240 may be configured to, during operation of the system 200 and using the data interface 220, access data 030, 041, 042. For example, as shown in FIG. 2, the data interface 220 may provide access 222 to an external data storage 022 which may comprise said data 030, 041, 042. Alternatively, the data 030, 041, 042 may be accessed from an internal data storage which is part of the system 200. Alternatively, the data 030, 041, 042 may be received via a network from another entity. In general, the data interface 220 may take various forms, such as a network interface to a local or wide area network, e.g., the Internet, a storage interface to an internal or external data storage, etc. The data storage 022 may take any known and suitable form.

The processor subsystem 240 may be further configured to, during operation of the system 200, train a model on the training dataset 030 to obtain the trained model 041. The trained model 041 may be configured to determine a model output for an input instance by determining a representation of the input instance in a latent space and determining the model output therefrom. The processor subsystem 240 may be further configured to, during operation of the system 200, determine a dataset fingerprint 042 of the trained model based on the training dataset 041. The dataset fingerprint 042 may characterize latent space representations of the training dataset 041 on which the trained model was trained.

As an optional component, the system 200 may comprise a sensor interface (not shown) for obtaining sensor data from one or more sensors. The training dataset may be determined based at least in part on the obtained sensor data. Sensor interfaces are discussed in more detail with respect to FIG. 1. The system 200 may also comprise a communication interface (not shown), configured for communication with other systems, e.g. a combination system for providing the trained model and dataset fingerprint to. Communication interfaces are discussed in more detail in FIG. 3.

Figure 5:
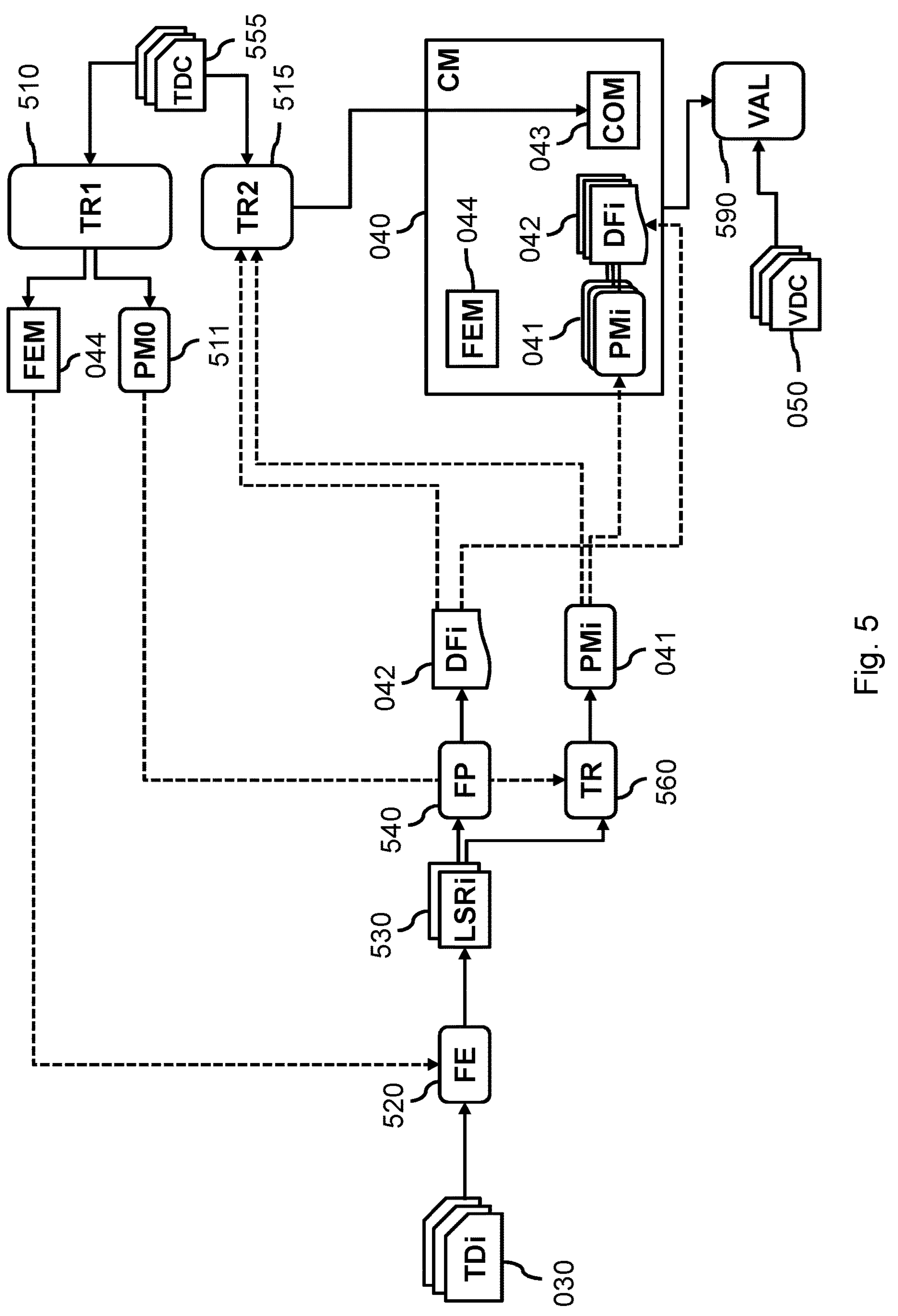
FIG. 5 shows a detailed example of how to obtain a combined model.

Various details and aspects of the operation of the system 200 will be further elucidated with reference to FIG. 5 and others, including optional aspects thereof.

In general, the system 200 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units, such as Graphics Processing Units (GPUs). The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA). In general, each functional unit of the system may be implemented in the form of a circuit. It is noted that the system 200 may also be implemented in a distributed manner, e.g., involving different devices or apparatuses, such as distributed servers, e.g., in the form of cloud computing.

Figure 3:
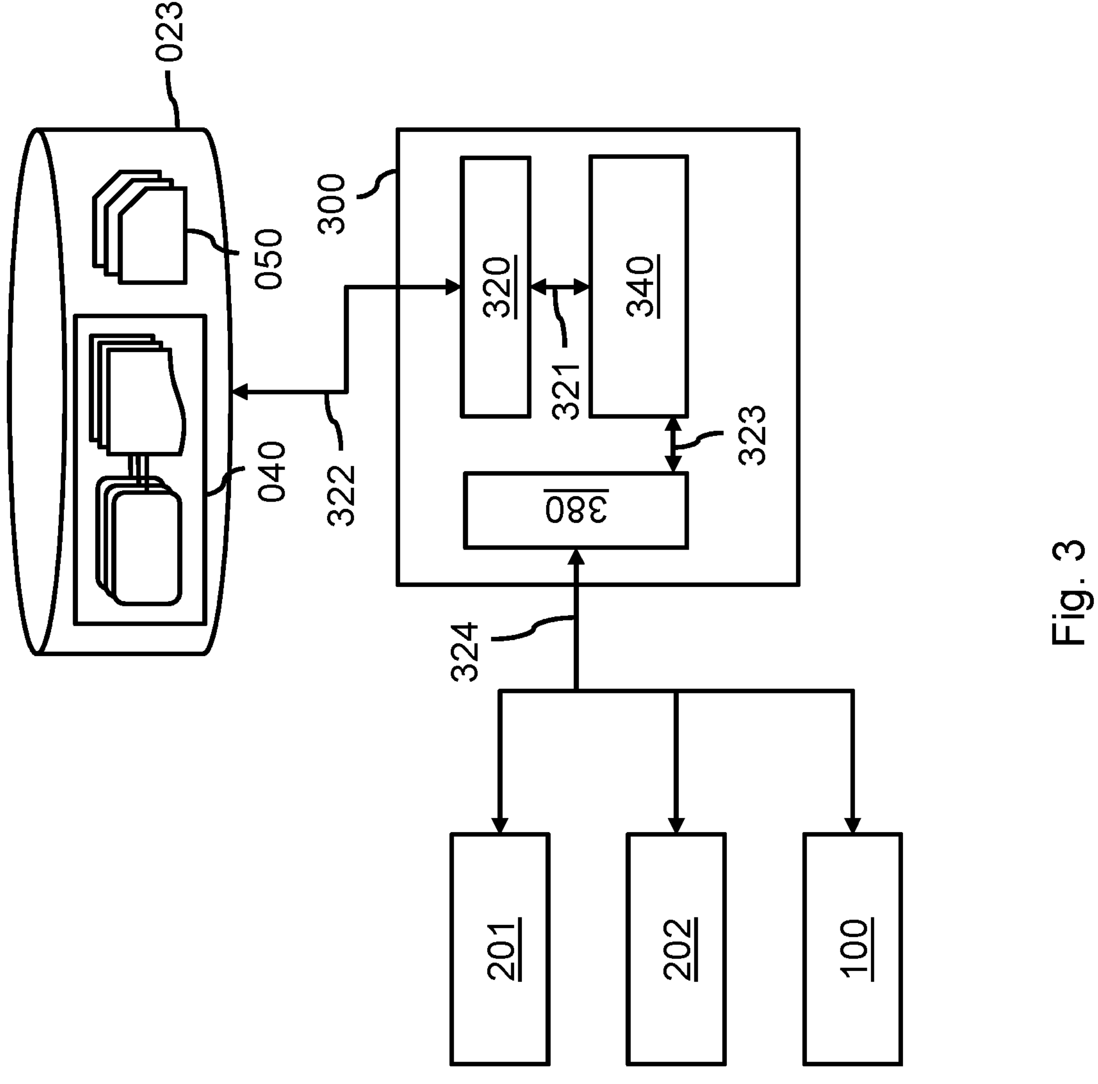
FIG. 3 shows a combination system for determining a combined model.

FIG. 3 shows a combination system 300 for determining a combined model from multiple trained models. System 300 may comprise a data interface 320 and a processor subsystem 340 which may internally communicate via data communication 321. Data interface 320 may be for accessing an optional validation dataset 050 comprising multiple validation input instances and corresponding validation outputs. Data interface 320 may also be for accessing the combined model 040 determined by the system 300. System 300 may also apply the determined combined model to an input instance as described herein, e.g., system 300 may be combined with system 100. System 300 may also train a model to be included in the trained model as described herein, e.g., system 300 may be combined with system 200.

The processor subsystem 340 may be configured to, during operation of the system 300 and using the data interface 320, access data 040, 050. For example, as shown in FIG. 3, the data interface 320 may provide access 322 to an external data storage 023 which may comprise said data 040, 050. Alternatively, the data 040, 050 may be accessed from an internal data storage which is part of the system 300. Alternatively, the data 040, 050 may be received via a network from another entity. In general, the data interface 320 may take various forms, such as a network interface to a local or wide area network, e.g., the Internet, a storage interface to an internal or external data storage, etc. The data storage 023 may take any known and suitable form.

The processor subsystem 340 may be further configured to, during operation of the system 300, receive multiple trained models and corresponding dataset fingerprints from multiple training systems as described herein. Shown in the figure are two training systems 201, 202. Generally, the number of training systems can be at least two, at least ten, at least fifty, etc. A trained model may be configured to determine a model output for an input instance by determining a representation of the input instance in a latent space common to the multiple trained models and determining the model output therefrom. A dataset fingerprint of a trained model may characterize latent space representations of training instances of the training dataset of the trained model. The processor subsystem 340 may be further configured to, during operation of the system 300, combine the multiple trained models and corresponding dataset fingerprints into a combined model 040 for determining a combined model output. Optionally, the processor subsystem 340 may be further configured to, during operation of the system 300, validate the combined model on the validation dataset 050. Performing validation is not necessary, and various other operations that may be performed by the combination system instead or in addition are described herein. Optionally, the processor subsystem 340 may be further configured to, during operation of the system 300, provide the combined model 040 to one or more prediction systems as described herein. This example shows a single prediction system 100. The combined model may be provided in various ways, e.g. by sending it directly, by providing access via an external repository, etc.

The system 300 may also comprise a communication interface 380 configured for digital communication 324 with other systems, e.g., the multiple training systems 201, 202 and/or the one or more prediction systems 100. Communication interface 380 may internally communicate with processor subsystem 340 via data communication 323. Communication interface 360 may be arranged for direct communication with the other systems 100, 201, 202, e.g., using USB, IEEE 1394, or similar interfaces. Communication interface 380 may also communicate over a computer network, for example, a wireless personal area network, an internet, an intranet, a LAN, a WLAN, etc. For instance, communication interface 380 may comprise a connector, e.g., a wireless connector, an Ethernet connector, a Wi-Fi, 4G or 5G antenna, a ZigBee chip, etc., as appropriate for the computer network. Communication interface 380 may also be an internal communication interface, e.g., a bus, an API, a storage interface, etc.

Various details and aspects of the operation of the system 300 will be further elucidated with reference to FIG. 5 and others, including optional aspects thereof.

In general, the system 300 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units, such as Graphics Processing Units (GPUs). The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA). In general, each functional unit of the system may be implemented in the form of a circuit. It is noted that the system 300 may also be implemented in a distributed manner, e.g., involving different devices or apparatuses, such as distributed servers, e.g., in the form of cloud computing.

FIG. 4 shows a detailed yet non-limiting example of the use of a combined model, for example, in the classification of electroencephalography waveform signals for epileptic seizure detection. Shown in the figure is a combined model CM, 040, that is used in determining a combined model output CMO, 490, from an input instance II, 410.

The combined model CM may comprise multiple trained models trained on respective training datasets, for example, at least 3, at least 10, or at least 50 models. The trained models may each be configured to determine a model output for an input instance by determining a representation of the input instance in a common latent space and determining the model output therefrom. In this specific example, the multiple trained models each use a common feature extraction model FEM, 044, to map input instances to the latent space, and each use a separate prediction model PMi, 041, to map latent space representations to model outputs. Although this is a good choice for ensuring exchangeability of latent space representations of the respective models, as also discussed elsewhere it is also possible for the respective trained models to have their own separate feature extractors. Since this example uses a common feature extractor between the trained models, the term "trained model" and "prediction model" are used interchangeably below.

As a concrete example of performing prediction based on extracted features of inputs in a latent space, analysis of EEG signals may be considered. As discussed above, in order to diagnose and monitor epilepsy, electrical activity of the brain may be measured in an electroencephalogram (EEG). Accordingly, the combined model may be used for various applications, including epileptic seizure detection in the EEG signal. In such cases, input instances may be segments, also known as windows, of the EEG signal, for example with a length of 1 or 2 seconds. The task to be performed by the combined model can be binary classification task for such a window, for example, classifying whether seizure activity is present or not. Such classification may be performed in a trained model by first applying a feature extraction model FEM that converts multi-channel EEG signals into latent vectors of a multi-dimensional feature space. In a trained model, the decision boundary of the classification may be fit using a classification model, e.g., an SVM classifier, a gradient boosted tree, a neural network, etcetera. Examples of such approaches are described in A. Shoeb and J. Guttag, "Application of Machine Learning To Epileptic Seizure Detection," 2010; and K. Tsiouris, S. Markoula, S. Konitsiotis, D. D. Koutsouris, and D. I. Fotiadis, "A robust unsupervised epileptic seizure detection methodology to accelerate large EEG database evaluation," Biomed. Signal Process. Control, vol. 40, pp. 275-285, 2018 (both incorporated herein by reference).

As another example of latent space representations that may be used, a trained model may comprise a convolutional neural network, for example, for facial recognition in images. In such a convolutional neural network, respective layers are typically trained to recognize low-level image features at various level of abstraction, e.g., first contours and lines, then low-level structures such as ears, eyes, etcetera, before finally recognizing a full face. In such an example, for example, either the contours/lines or the low-level structures can be used as latent space representations.

However, representations of input instances in latent spaces occur much more generally for various types of input instances II. Instead of EEG signals specifically, various types of time-series sensor data, specifically of physiological measurements, e.g., vital sign readings, may be used. Such time-series data may be analysed at particular points in time by classifying segments, but also their development over time may be analysed, for example, using recurrent neural networks and the like. The output of such a recurrent neural network or other recurrent model may then be further analysed in prediction model to reach a desired conclusion. Also such a recurrent model representation of a time-series signal can be used as a latent space representation as described herein, the recurrent model being considered as a feature extraction model FEM. As another example, also trained models for analysing images, e.g., convolutional neural networks, deep neural networks, and the like, typically have intermediate latent space representations, e.g., outputs of intermediate neural network layers. The part of the neural network up to that intermediate layer can be regarded as a feature extraction model FEM. Various other applications will be apparent.

It is noted that typically, a latent space representation LSR is much smaller, e.g., contains much fewer elements, than an input instance II. For example, a typical input instance may comprise at least 1000, at least 10000, or at least 1000000 features. A latent space representation may comprise at most 100 or at most 1000 features, for example, or have at most one tenth or one hundredth of the number of features of the input instance.

As shown in the figure, combined model CM may further comprise respective dataset fingerprints DFi, 042, of the multiple trained models. Dataset fingerprint DFi of a trained model PMi may characterize latent space representations of training instances of the training dataset on which the trained model PMi was trained. Generally, a dataset fingerprint DFi may be a characteristic of the dataset that captures important features of the dataset, preferably without compromising the data privacy. The exact type of dataset fingerprint to be used typically depends strongly on the nature of data, e.g., a different type of fingerprint may be defined for a particular domain and/or problem. Several specific examples of dataset fingerprints are provided below.

Using the dataset fingerprints DFi, in a feature correspondence step FC, 440, correspondence scores CSi, 450, may be determined between the input instance II and the multiple trained models PMi, indicating correspondences between the input instance II and the training datasets on which the trained models were trained. Since the dataset fingerprints characterize latent space representations of the training instances, also the input instance II is typically converted into the latent space. In this example, since the multiple trained models share feature extraction mode FEM, a single latent space representation LSR, 430, is obtained for input instance II, by feature extraction FE, 420, using the feature extraction model FEM. However, in cases where respective trained models have respective feature extractors, also respective latent space representations of the input instance may be determined for comparison to the respective dataset fingerprints DFi.

Generally, a correspondence score CSi with respect to a trained model PMi may be determined by comparing the distribution of latent feature vectors of the input instance II with a distribution of latent feature vectors of the trained model, as comprised in its dataset fingerprint DFi. The distribution can be captured in various ways, e.g., by a mean or median value and/or by parameters of a probability distribution, e.g., univariate or multivariate Gaussian, fit on the training dataset, by storing a histogram of values of a feature or of combinations of values of multiple features, etcetera.

One particularly effective way of capturing the distribution of latent feature vectors is by making use of cluster centroids. Dataset fingerprint DFi may in such a case comprise multiple cluster centroids in the latent space, where a cluster centroid represents a cluster of training input instances. Such a cluster may represent a number of training instances that have the same label and/or have similar representations in the latent space. Correspondence score CSi between the input instance II and a trained model PMi may then be determined based on similarity values, e.g. distances, between the input instance II and the multiple cluster centroids. Apart from the cluster centroids, also variances of the respective clusters may be included. The correspondence score CSi may then be based additionally on these variances, for example by normalizing distances according to their variances or in other ways known per se for clustering algorithms.

When comparing latent representations or subsets of features of latent representations, e.g., when comparing input instance II to a cluster centroid or to a mean or median of features, generally, various distance metrics can be used. As a specific example, Euclidean or weighted Minkowski distance may be used. In particular, using Minkowski distance may allow to adjust relative contributions of different features, e.g., allowing to emphasize the importance of significant latent features and to reduce sensitivity to features with high variance. Accordingly, it is possible to select or assign higher importance to models that were trained on similar data, e.g. whose feature vector distributions are close to the distributions of the input instance.

For example, in the EEG case, a combination of centroid feature vectors corresponding to the typical seizure and non-seizure windows, as well as the variances of the seizure and non-seizure feature vector distributions can be used as a dataset fingerprint DFi e.g. for the problem of epileptic seizure detection. For example, dataset fingerprint DFi may be constructed by applying a clustering algorithm in the latent space, with dataset fingerprint DFi containing information about clusters that were found.

In various embodiments, correspondence score CSi between input instance II and the trained model PMi is further based on the input instance II and/or a model output of the trained model PMi for the input instance. In such a case the data fingerprint may characterize not just latent space representations of the training dataset, but also the training instances and/or model outputs of the trained model for the training instances. Here, the training instance and input instance may include metadata that is not used by trained model by PMi, e.g., PMi may be an image classifier, the metadata including information about a patient captured in an image. It is noted that, in case outputs are used, trained model PMi may be executed on input instance II to determine correspondence score CSi, but this does not necessarily mean that this output is also used to determine combined model output CMO, e.g., if it turns out that the trained model does not match the input instance II in terms of inputs, latent features, and/or outputs well.

For example, in the medical context, features or metadata of the input instance that can be included in the dataset fingerprint can be information about population peculiarities of patients in the training datasets, e.g.:

- minimum, median and/or maximum ages of the patient cohort, or distribution of patient ages, e.g., to allow proper selection of a model for an infant or elderly patient while maintaining patient privacy;
- gender ratio of the patient cohort;
- prevailing type of medical treatment in the patient cohort;
- most probable location of the epileptic focus, symptoms, medication, etc.

Instead or in addition to the above examples, a dataset fingerprint DFi may comprise a generative model. Correspondence score CSi may in this case be determined based on a likelihood of the latent space representation being generated by the generative model. For example, various generative models are known in the art per se, such as variational autoencoders (VAEs) or generative adversarial networks (GANs), especially for images. Image datasets are very common in various applications and domains, ranging from image classification to medical image segmentation. Such a generative model, for example a deep convolutional generative model, may effectively learn a probability distribution of a training dataset. Accordingly, a trained generative model may be included in the dataset fingerprint DFi. The definition of a distance between training dataset fingerprint DFi and the input instance II may then be based on the estimated probability of the input instance II belonging to the distribution of training instances in terms of latent space representations. For example, in case of the VAE, the reconstruction loss may be used as a correspondence score CSi. In case of GAN, the discriminator part of the trained GAN may be used to distinguish between instances that are similar to the training set and instances that do not look similar. It is noted that generative models such as VAEs and GANs can also be used on non-imaging data, for example EEG signals as also described elsewhere.

Based on the correspondence scores CSi, in a combination operation CB, 480, combined model output CMO may be determined by combining respective model outputs MOi, 470, into the combined model output CMO, according to the determined correspondence scores CSi of the respective trained models PMi. Depending on how the outputs are combined, for example, a strict subset of model outputs MOi of sufficiently corresponding trained models may be used. In this case, model application operation MA, 460, may determine model outputs of that subset of trained models PMi. It is also possible for combination operation CB to use outputs MOi of all trained models, in which case model application operation MA may determine all model outputs. Effectively, by selecting or assigning more importance to the most models as indicated by training dataset fingerprints DFi, the combination operation CB may be regarded to construct a dynamically adaptive, optimized meta-model comprising of individual models that were trained on similar data.

Given suitable models as identified by determining correspondence scores CSi, various approaches can be used for building this meta-model from the individual models PMi. For example, one possibility is to perform model blending, e.g., to determine combined model output CMO as an average of model outputs of a subset of sufficiently corresponding models, e.g., CSi>T for a predefined threshold T, that are independently applied to the input instance:

$$MetaModel(\text{New data}) = \sum_{i=1}^{N} \text{Model}_i(\text{New data}).$$

As another example, also a weighted sum of some or all of the determined model outputs MOi can be computed based on the respective correspondence scores CSi. For example, the weights of the weighted sum may be proportional to the model correspondence, e.g.:

$$MetaModel(\text{New data}) = \sum_{i=1}^{N} w_i \text{ Model}_i(\text{New data}).$$

As a concrete example, weights $w_i$ can be inversely proportional to a distance D between fingerprints of new data F(New data) and data used for training a trained model F(Data$_i$):

$$w_i \propto D^{-1}(F(\text{New data}), F(\text{Data}_i)).$$

As shown in the figure, determined model outputs MOi may also be combined into the combined model output CMO by applying a trainable combination model COM, 043, to the determined correspondence scores CSi and model outputs MOi. The combination model COM is typically comprised in the combined model CM. For example, the combination model can be a decision tree or a linear regression model for computing the combined model output from the determined model outputs, etcetera. The combination model COM may take the correspondence scores as input and output weights or a selection of models for use by a combination function, but the combination model can also take the model outputs MOi themselves as input in addition to the correspondence scores CSi and output the combined model output CMO directly.

Instead of, or in addition to, determining combined model output CMO, also a reliability score of the combined model output CMO may be determined based on the determined correspondence scores CSi. The reliability score may indicate a correspondence between the input instance II and the combined training datasets of the multiple trained models DFi. A reliability score may be determined that is appropriate for the way model outputs MOi are combined into the combined model output CMO, for example, a number of used trained models when using model blending as discussed above, or an average correspondence score in case a weighted sum is used, etcetera. The combination model COM may be a stochastic model, e.g., a Bayesian neural network, configured to provide both combined model output CMO and a reliability score indicating a certainty of the combined model output.

FIG. 5 shows a detailed yet non-limiting example of fingerprinting a trained model and combining trained models and dataset fingerprints into a combined model. For example, the fingerprinting may be performed by a training system or method as described herein, and the combining may be performed by a combination system of method as described herein. Several elements in this figure correspond to elements of FIG. 4, in particular the combined model CM, 040, and the instances it is applied to, and any many options described with respect to that figure also apply here.

Specifically, shown in this figure is a training dataset TDi, 030, for training a trained model for use in the combined model CM. The training dataset typically comprises data of one or a few collaborating organizations that cannot be shared outside of those organizations. For example, a dataset of a particular hospital may comprise data about at most one hundred thousand or at most one million patients, e.g., in case of a common condition, or at most 100, at most 1000, or at most 10000, e.g., in case of a rarer condition.

Based on the training dataset TDi, a model may be trained in a training operation TR, 560, to obtain a trained model PMi, 041. The trained model may be configured to determine model outputs for input instances by determining representations LSRi, 530, of the input instances in a latent space and determining the model output therefrom, as also discussed with respect to FIG. 4. In this example, as in FIG. 4, the respective trained models comprise a common feature extraction model FEM, 044, and respective prediction models PMi. For example, feature extraction model FEM may be used in feature extraction operation FE, 520, to obtain latent space representations LSR, 530, of training instances of a training dataset TDi. As indicated by the dashed line from feature extraction model FEM to feature extractor FE, in this particular example, the feature extraction model is not trained as part of training the trained model, but obtained as a pre-trained feature extraction model from another party, for example, a combination system. However, it is also possible to, as part of the training, train a feature extractor from scratch or to refine a pre-trained feature extraction model FEM based on the training dataset, e.g., by performing one or more gradient descent iterations, or using techniques for refining a trained model that are known per se in the field of transfer learning. In such cases, the trained model may comprise the refined feature extraction model as well as the prediction model.

The prediction model PMi may be trained using the latent representations, e.g., using techniques known in the art per se like stochastic gradient descent or any other method suitable for the type of model at hand. As shown in this figure, prediction model PMi may be based on a pre-trained prediction model PM0, 511. Pre-trained prediction model PM0 may be obtained and then refined as part of training the trained model PMi, e.g., using techniques that are known per se. The feature extractor and prediction model can be trained in a combined training operation.

Apart from training the model PMi, also in a fingerprinting operation FP, 540, a dataset fingerprint DFi, 042, of the trained model may be determined based on the training dataset TDi. The dataset fingerprint DFi may characterize latent space representations LSRi of the training dataset TDi on which the trained model was trained. Various data that can be included in the dataset fingerprint is discussed throughout, e.g., with respect to FIG. 4, and can be determined accordingly. For example, a clustering algorithm may be used to determine cluster centroids; a Generative Adversarial Network or Variational Autoencoder may be trained to obtain a generative model; statistical parameters of latent features or training inputs or outputs, e.g., metadata, may be determined, etcetera.

The trained model, e.g., the prediction model PMi and possibly the refined feature extraction model, may be provided to another party for determining a combined model CM, for example, uploaded to a repository or sent. Interestingly, since the trained model and the dataset fingerprint typically represent aggregated information, this can be done with minimal impact to privacy or sensitivity of the training dataset TDi. To ensure this, optionally, a privacy check can be performed, e.g., it can be checked whether the trained model and/or dataset fingerprint satisfy a privacy property such as k-anonymity. It is also possible to refine the trained model and/or dataset fingerprint to satisfy a privacy property, e.g., by adding noise, removing elements that are based on too few training records, etcetera. Accordingly, the organization holding the training dataset TDi may be enabled to make the dataset available for use in combined model CM without needing to disclose sensitive data.

Focusing now on how combined model CM may be determined. The party compiling the combined model CM may receive or otherwise obtain multiple trained models PMi and corresponding dataset fingerprints DFi from multiple training systems, as described herein. These multiple trained models PMi and corresponding dataset fingerprints DFi may then be combined into the combined model CM for determining a combined model output. For example, a combined model CM may be stored as a single file or database that includes the multiple trained models and dataset fingerprints, or the combined model may contain references to the multiple trained models and dataset fingerprints, e.g., URLs from which the trained models can be obtained or at which they can be accessed, e.g., using an API call. In this example, the trained models have a common feature extraction model FEM, so that the multiple trained models are comprised in the combined model CM in the form of the common feature extraction model FEM and separate prediction models PMi, e.g., classification or regression models that use latent space representations as inputs. Apart from combining obtained trained models PMi and dataset fingerprints DFi, the determination of a combined model can comprise various other optional steps, several of which are illustrated in the figure and many of which can be arbitrarily combined.

In particular, as shown in the figure, determining the combined model may optionally comprise, in a first training operation TR1, 510, training a feature extraction model FEM, 044. This training may take place on a training dataset TDC, 555. This may be a publicly available dataset, for example, or a dataset that is also used to determine a trained model from, e.g., if the determination of the combined model CM is combined with the training of a trained model included in the combined model CM. As part of the initial training, and typically on the same dataset, also an initial prediction model PM0, 511, for determining model outputs from representations of input instances in the latent space may be trained. The initial prediction model PM0 can be a separate prediction model, e.g., trained on a public dataset, or one of the prediction models PMi of the combined model.

The trained feature extraction model FEM and/or initial prediction model PM0 are typically provided to training systems for performing training on their respective datasets, as illustrated by the dashed lines from these models to the feature extraction operation FE and the training operation TR performed as part of training. In this example, a common feature extraction model is used so model FEM is also included in the combined model CM, although it is also possible to obtain respective refined feature extraction models and include those in the combined model, as also discussed elsewhere.

Another operation that may optionally be carried out as part of determining the combined model CM is the training, in a second training operation TR2, 515, of a combination model COM, 043, for combining model outputs into combined model outputs. For example, based on training dataset TDC as discussed above or another dataset comprising training instances and desired training outputs, model outputs of the respective trained models TMi for a training instance, and respective correspondence score of the training instance with respect to the respective trained models may be determined. Based on this, the combination model COM may be trained to compute the desired training output directly, or by computing weights or a selection of models that can be used in combination with the outputs of respective trained models to determine a combined model output. The trained combination model COM may then be included in the combined model CM.

Another operation that may optionally be carried out as part of determining the combined model is a validation operation VAL, 590, of validating the combined model CM on a validation dataset VDC, 050. For example, an accuracy of the combined model on the validation dataset may be determined, for example, to flag an error if the accuracy does not meet a predefined threshold. Accordingly, an overall performance of the combined model may be guaranteed. Also, the contributions of individual trained models to the overall model may be determined, e.g., by determining an accuracy of the combined model form which one of the trained models is removed and determining its impact to the overall accuracy. As another example, contributions of individual trained models to the combined model CM may be validated, e.g., by computing their average weight in weighted combinations, the number of times the model outputs of the trained model are included in the combined model output, etcetera. Accordingly, various possibilities may be provided for a model user to get feedback about the internals of the combined model, in other words, to allow "debugging" of the trained model to further improve its accuracy.

Specifically, the determination of the combined model may comprise two phases: a first phase in which data is determined to provide to training systems, such as feature extraction model FEM and initial prediction model PM0, and a second phase in which information received from the training systems is used to determine the combined model CM, e.g., by training combination model COM, combining the received models and fingerprints into the combined model, and/or performing validation.

A determined combined model can also be updated, e.g., by adding additional trained models PMi and corresponding dataset fingerprints DFi to the combined model CM; by removing trained models and their fingerprints, for, example, if it is found that they adversely affect accuracy; or by updating them, for example, as new training becomes available. The updating may also comprise re-training or refining the combination model COM, for example. Interestingly, since the trained models are treated separately in the combined model, such updating operations may be relatively efficient to perform.

Figure 6:
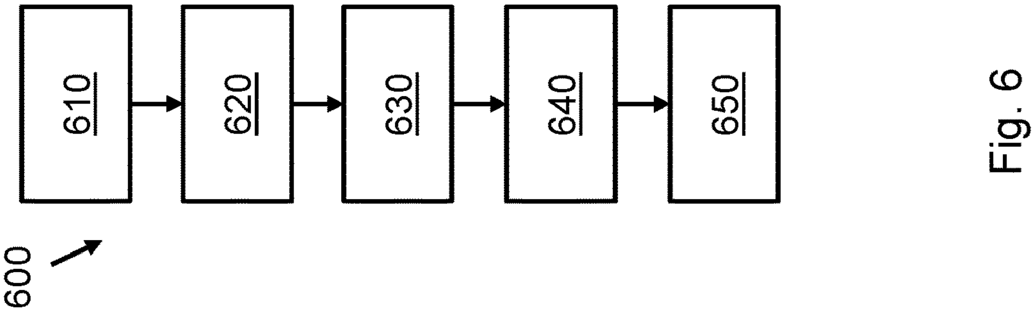
FIG. 6 shows a computer-implemented method of applying multiple trained models to an input instance.

FIG. 6 shows a block-diagram of a computer-implemented method 600 of applying multiple trained models to an input instance. The multiple trained models may be trained on respective training datasets. The method 600 may correspond to an operation of the system 100 of FIG. 1. However, this is not a limitation, in that the method 600 may also be performed using another system, apparatus, or device.

The method 600 may comprise, in an operation titled "ACCESSING TRAINED MODELS AS COMBINED MODEL", accessing 610 the multiple trained models in the form of a combined model. The combined model may define a latent space. A trained model may be configured to determine a model output for the input instance by determining a representation of the input instance in the latent space and determining the model output therefrom. The combined model may further comprise respective dataset fingerprints of the multiple trained models. A dataset fingerprint of a trained model may characterize latent space representations of training instances of the training dataset of the trained model.

The method 600 may further comprise, in an operation titled "OBTAINING INPUT INSTANCE", obtaining 620 an input instance.

The method 600 may further comprise, in an operation titled "DETERMINING CORRESPONDENCE SCORES", determining 630 correspondence scores between the input instance and the multiple trained models. A correspondence score between the input instance and a trained model may indicate a correspondence between the input instance and the training dataset of the trained model. The correspondence score may be based on a representation of the input instance in the latent space and the dataset fingerprint of the trained model.

The method 600 may further comprise, in an operation titled "DETERMINING MODEL OUTPUTS OF TRAINED MODELS", determining 640 model outputs of one or more of the multiple trained models for the input instance.

The method 600 may further comprise, in an operation titled "COMBINING INTO COMBINED MODEL OUTPUT", combining 650 the model outputs into the combined model output according to the determined correspondence scores of the respective trained models.

Figure 7:
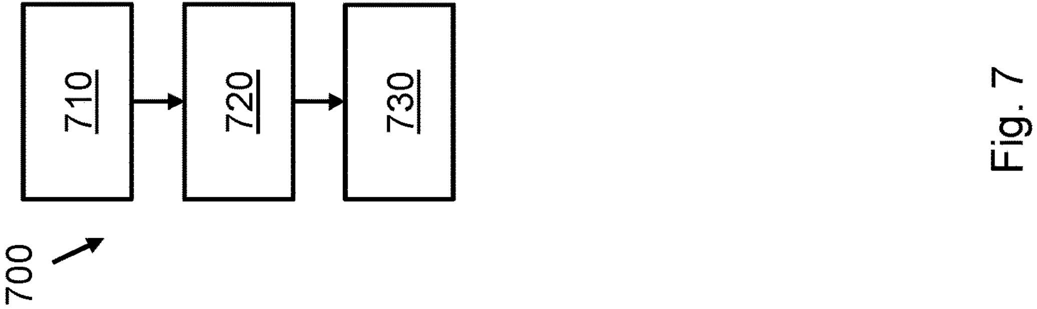
FIG. 7 shows a computer-implemented method of fingerprinting a trained model.

FIG. 7 shows a block-diagram of a computer-implemented method 700 of fingerprinting a trained model. The method 700 may correspond to an operation of the system 200 of FIG. 2. However, this is not a limitation, in that the method 700 may also be performed using another system, apparatus, or device.

The method 700 may comprise, in an operation titled "ACCESSING TRAINING DATASET", accessing 710 a training dataset.

The method 700 may further comprise, in an operation titled "TRAINING MODEL", training 720 a model on the training dataset to obtain the trained model. The trained model may be configured to determine a model output for an input instance by determining a representation of the input instance in a latent space and determining the model output therefrom.

The method 700 may further comprise, in an operation titled "DETERMINING DATASET FINGERPRINT", determining 730 a dataset fingerprint of the trained model based on the training dataset. The dataset fingerprint may characterize latent space representations of the training dataset on which the trained model was trained.

Figure 8:
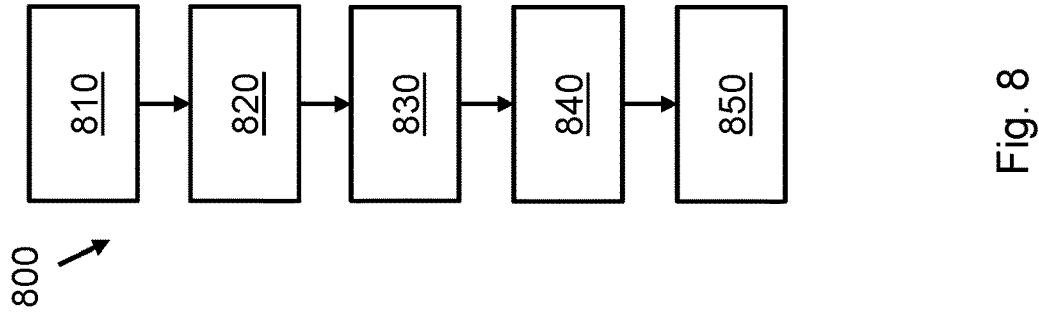
FIG. 8 shows a computer-implemented method of determining a combined model from multiple trained models.

FIG. 8 shows a block-diagram of computer-implemented method 800 of determining a combined model from multiple trained models. The method 800 may correspond to an operation of the system 300 of FIG. 3. However, this is not a limitation, in that the method 800 may also be performed using another system, apparatus, or device.

The method 800 may comprise, in an operation titled "ACCESSING VALIDATION DATASET", accessing 810 a validation dataset comprising multiple validation input instances and corresponding validation outputs.

The method 800 may further comprise, in an operation titled "ARRANGING DIGITAL COMMUNICATION", arranging 820 digital communication with multiple training systems;

The method 800 may further comprise, in an operation titled "RECEIVING MODELS, FINGERPRINTS", receiving 830 multiple trained models and corresponding dataset fingerprints from the multiple training systems. A trained model may be configured to determine a model output for an input instance by determining a representation of the input instance in a latent space common to the multiple trained models and determining the model output therefrom. A dataset fingerprint of a trained model may characterize latent space representations of training instances of the training dataset of the trained model.

The method 800 may further comprise, in an operation titled "COMBINING INTO COMBINED MODEL", combining 840 the multiple trained models and corresponding dataset fingerprints into a combined model for determining a combined model output.

The method 800 may further comprise, in an operation titled "VALIDATING COMBINED MODEL", validating 850 the combined model on the validation dataset.

It will be appreciated that, in general, the operations of method 600 of FIG. 6, method 700 of FIG. 7, and/or method 800 of FIG. 8 may be performed in any suitable order, e.g., consecutively, simultaneously, or a combination thereof, subject to, where applicable, a particular order being necessitated, e.g., by input/output relations. The methods may also be combined in a single method, e.g., by applying a previously determined combined model to an input instance, or by determining and/or applying a combined model that includes a previously trained model.

Figure 9:
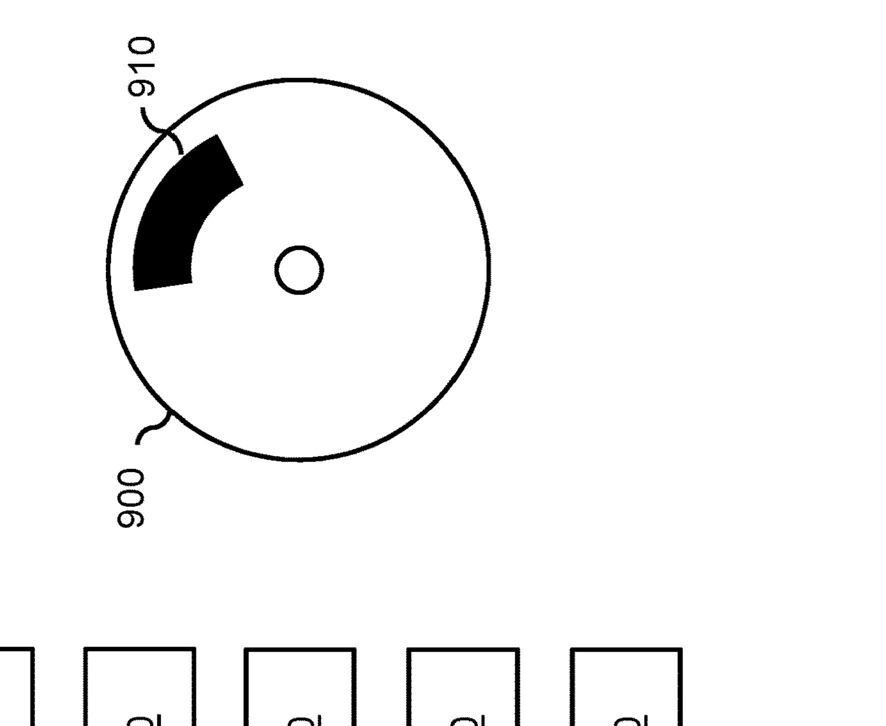
FIG. 9 shows a computer-readable medium comprising data.

The method(s) may be implemented on a computer as a computer implemented method, as dedicated hardware, or as a combination of both. As also illustrated in FIG. 9, instructions for the computer, e.g., executable code, may be stored on a computer readable medium 900, e.g., in the form of a series 910 of machine-readable physical marks and/or as a series of elements having different electrical, e.g., magnetic, or optical properties or values. The executable code may be stored in a transitory or non-transitory manner. Medium 900 may, instead or in addition, store data representing a combined model, e.g., for use in a method as described herein. The combined model may define a latent space. The combined model may comprise multiple trained models trained on respective training datasets. Such a trained model may be configured to determine a model output for an input instance by determining a representation of the input instance in the latent space and determining the model output therefrom. The combined model may further comprise respective dataset fingerprints of the multiple trained models. A dataset fingerprint of a trained model may characterize latent space representations of training instances of the training dataset of the trained model. Examples of computer readable mediums include memory devices, optical storage devices, integrated circuits, servers, online software, etc. FIG. 9 shows an optical disc 900.

Examples, embodiments or optional features, whether indicated as non-limiting or not, are not to be understood as limiting the invention as claimed.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A prediction system for applying multiple trained models to an input instance, wherein the multiple trained models are trained on respective training datasets, comprising:

a data interface configured to access the multiple trained models in the form of a combined model, the combined model defining a latent space, a trained model being configured to determine a model output for the input instance by determining a representation of the input instance in the latent space and determining the model output therefrom, the combined model further comprising respective dataset fingerprints of the multiple trained models, a dataset fingerprint of a trained model characterizing latent space representations of training instances of the training dataset of the trained model for determining a likelihood of similarity of an input instance to the multiple trained models; and a processor subsystem configured to provide a combined model output for the multiple trained models by:

obtaining an input instance;

determining correspondence scores between the input instance and the multiple trained models, a correspondence score between the input instance and a trained model indicating a correspondence between the input instance and the training dataset of the trained model, the correspondence score being based on a representation of the input instance in the latent space and the dataset fingerprint of the trained model;

determining model outputs of one or more of the multiple trained models for the input instance; and combining the model outputs into the combined model output according to the determined correspondence scores of the respective trained models.

2. The system as in claim 1, wherein the input instance comprises one or more of an image, a stack of multiple images, and time-series sensor data, for example, of physiological measurements.

3. The system as in claim 1, wherein the dataset fingerprint of the trained model comprises multiple cluster centroids in the latent space, a cluster centroid representing a cluster of training input instances, the processor subsystem being configured to determine a correspondence score between the input instance and the trained model based on similarity values between the input instances and the multiple cluster centroids.

4. The system as in claim 1, wherein the dataset fingerprint of the trained model comprises a generative model, the processor subsystem being configured to determine the correspondence score between the input instance and the trained model based on a likelihood of the latent space representation being generated by the generative model.

5. The system as in claim 1, wherein the correspondence score between the input instance and the trained model is further based on the input instance and/or a model output of the trained model for the input instance, the dataset fingerprint of the trained model further characterizing training instances and/or training outputs.

6. The system as in claim 1, wherein the processor subsystem is configured to combine the determined model outputs into the combined model output by applying a trainable combination model to the determined correspondence scores and model outputs.

7. The system as in claim 1, wherein the processor subsystem is further configured to determine a reliability score of the combined model output based on the determined correspondence scores, the reliability score indicating a correspondence between the input instance and the combined training datasets of the multiple trained models.

8. A computer-implemented method of applying multiple trained models to an input instance, wherein the multiple trained models are trained on respective training datasets, comprising:

accessing the multiple trained models in the form of a combined model, the combined model defining a latent space, a trained model being configured to determine a model output for the input instance by determining a representation of the input instance in the latent space and determining the model output therefrom, the combined model further comprising respective dataset fingerprints of the multiple trained models, a dataset fingerprint of a trained model characterizing latent space representations of training instances of the training dataset of the trained model for determining a likelihood of similarity of an input instance to the multiple trained models; and obtaining an input instance;

determining correspondence scores between the input instance and the multiple trained models, a correspondence score between the input instance and a trained model indicating a correspondence between the input instance and the training dataset of the trained model, the correspondence score being based on a representation of the input instance in the latent space and the dataset fingerprint of the trained model;

determining model outputs of one or more of the multiple trained models for the input instance; and combining the model outputs into the combined model output according to the determined correspondence scores of the respective trained models.

9. The computer-implemented method of claim 8, wherein the input instance comprises one or more of an image, a stack of multiple images, and time-series sensor data, for example, of physiological measurements.

10. The computer-implemented method of claim 8, wherein the dataset fingerprint of the trained model comprises multiple cluster centroids in the latent space, a cluster centroid representing a cluster of training input instances, and wherein the method comprises determining a correspondence score between the input instance and the trained model based on similarity values between the input instances and the multiple cluster centroids.

11. The computer-implemented method of claim 8, wherein the dataset fingerprint of the trained model comprises a generative model, and wherein the method comprises determining the correspondence score between the input instance and the trained model based on a likelihood of the latent space representation being generated by the generative model.

12. The computer-implemented method of claim 8, wherein the correspondence score between the input instance and the trained model is further based on the input instance and/or a model output of the trained model for the input instance, the dataset fingerprint of the trained model further characterizing training instances and/or training outputs.

13. The computer-implemented method of claim 8, wherein the method further comprises combining the determined model outputs into the combined model output by applying a trainable combination model to the determined correspondence scores and model outputs.

14. The computer-implemented method of claim 8, wherein the method further comprise determining a reliability score of the combined model output based on the determined correspondence scores, the reliability score indicating a correspondence between the input instance and the combined training datasets of the multiple trained models.

* * * * *